J. A. BECHER.
VEHICLE.
APPLICATION FILED MAY 13, 1912.
1,074,596.
Patented Oct. 7, 1913.
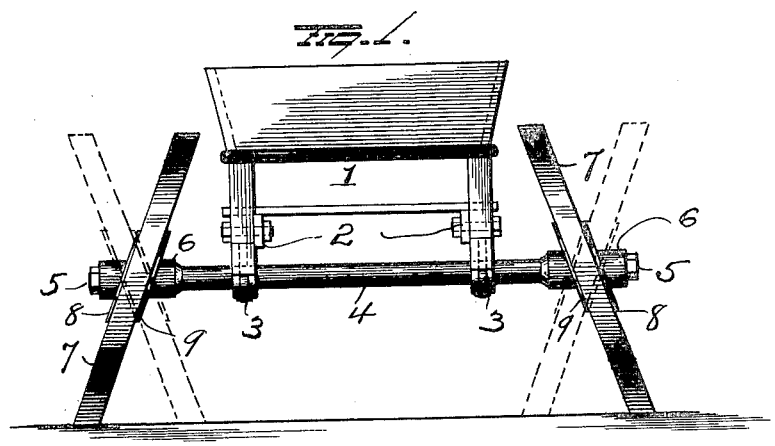
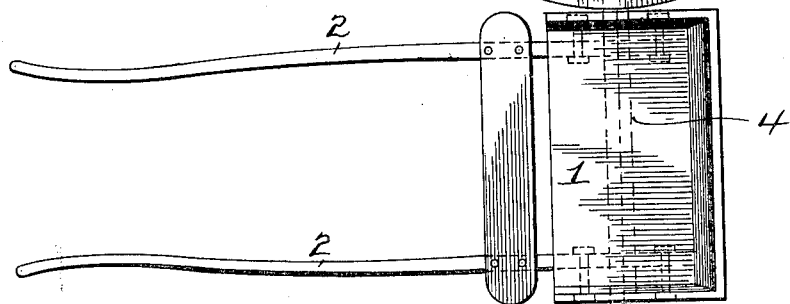
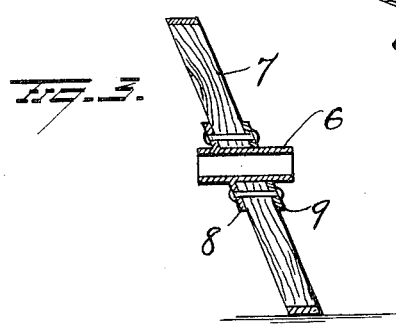
WITNESSES
INVENTOR
J. A. Becher
Attorney

UNITED STATES PATENT OFFICE.

JAMES A. BECHER, OF CHICAGO, ILLINOIS.

VEHICLE.

1,074,596.  Specification of Letters Patent.  Patented Oct. 7, 1913.

Application filed May 13, 1912. Serial No. 697,059.

*To all whom it may concern:*

Be it known that I, JAMES A. BECHER, of Chicago, in the county of Cook and State of Illinois, have invented certain new and useful Improvements in Vehicles; and I do hereby declare the following to be a full, clear, and exact description of the invention, such as will enable others skilled in the art to which it appertains to make and use the same.

This invention relates to improvements in vehicles and more particularly to such as are adapted for advertising purposes,—the object of the invention being to so construct and mount the wheels of the vehicle that they will travel in a wabbling or serpentine path and thus attract attention of passers-by to the vehicle.

With this object in view, the invention consists in certain novel features of construction and combinations of parts as hereinafter set forth and pointed out in the claim.

In the accompanying drawings; Figure 1 is a rear view of a vehicle showing an embodiment of my invention; Fig. 2 is a plan view of the same and Fig. 3 is a sectional view showing one of the wheels.

My invention is applicable to either two or four wheeled vehicles of various types, but for convenience I have shown the wabbling wheels applied to a two-wheeled sulky.

1 represents the body of the vehicle provided with thills 2 and supported by means of clamps 3 on an axle 4. The axle is made with suitable spindles 5 at its ends, and these spindles are mounted in the hubs 6 of wabbling wheels 7.

The wheels 7 are preferably made solid and are disposed at opposite angles of inclination, each approximately sixty degrees (more or less) to the axis of the hub. The body of the wheel may be made of any suitable material and may be secured to the hub in any desired manner. The angles of inclination of said wheels are such that they will, when at rest, be divergent with respect to each other, from points either above or below the longitudinal axis of the vehicle body, and so that during revolution of said wheels, said angles of inclination will gradually shift outwardly and then inwardly with respect to the vehicle body, and in planes at right angles to the axis of the vehicle body.

In the drawings, I have shown the hub or sleeve 6 provided with an annular flange 8, the latter being secured to the body of the wheel at one side thereof, and a circular plate 9 may be secured to the opposite side of the wheel,—said flange and ring each being disposed at an angle of sixty degrees (more or less) relatively to the hub or sleeve.

Advertising matter may be placed on the wheels, and also on the body of the vehicle if desired.

By disposing the wheels on the axle at an angle other than a right angle to the axis of the axle, the wheels will wabble and travel in serpentine paths as the vehicle moves forwardly and yet permit the body of the vehicle to move in a straight line. By so mounting the wheels at respective ends of the axle that they can rotate independently of each other, the respective wheels may travel in serpentine paths which would not be parallel with each other.

With my improvements, the vehicle will have the appearance of being all awry and will therefore create considerable curiosity as it proceeds along the street and thus attract the attention of pedestrians to the advertising matter depicted upon the wheels or other parts of the vehicle.

Having fully described my invention what I claim as new and desire to secure by Letters Patent, is:—

An advertising vehicle comprising a body, an axle, and wheels mounted loosely on the axle and each disposed at an angle other than a right angle to the axle, whereby a wabbling motion may be imparted to the vehicle body to attract attention for advertising purposes.

In testimony whereof, I have signed this specification in the presence of two subscribing witnesses.

JAMES A. BECHER.

Witnesses:
C. A. VEITCH,
GEO. M. HOOD.